US009392036B2

(12) United States Patent
Kitazawa

(10) Patent No.: US 9,392,036 B2
(45) Date of Patent: Jul. 12, 2016

(54) TERMINAL DEVICE AND COMMUNICATION SYSTEM

(71) Applicant: Kazuki Kitazawa, Kanagawa (JP)

(72) Inventor: Kazuki Kitazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/625,204

(22) Filed: Feb. 18, 2015

(65) Prior Publication Data

US 2015/0235650 A1    Aug. 20, 2015

(30) Foreign Application Priority Data

Feb. 19, 2014  (JP) .................................. 2014-029901
Dec. 15, 2014  (JP) .................................. 2014-253498

(51) Int. Cl.
| *H04N 7/14* | (2006.01) |
| *H04L 29/06* | (2006.01) |
| *H04N 7/15* | (2006.01) |
| *G10L 25/57* | (2013.01) |
| *G10L 19/00* | (2013.01) |
| *H04N 21/4402* | (2011.01) |
| *G10L 13/047* | (2013.01) |

(52) U.S. Cl.
CPC ............ *H04L 65/1083* (2013.01); *G10L 19/00* (2013.01); *G10L 25/57* (2013.01); *H04N 7/15* (2013.01); *H04N 21/440236* (2013.01); *G10L 13/047* (2013.01); *H04N 7/147* (2013.01)

(58) Field of Classification Search
CPC ..... H04L 65/1083; G10L 19/00; G10L 25/57; H04N 7/15; H04N 21/440236
USPC .................. 345/1.1; 348/14.04, 14.13, 208.1, 348/211.5, 569, 14.08, 241; 382/100; 463/42, 43; 704/260, 276; 701/429; 715/235

See application file for complete search history.

(56) References Cited

U.S. PATENT DOCUMENTS

| 6,243,685 | B1 * | 6/2001 | Welch ................... | B60Q 1/503 340/426.24 |
| 6,267,676 | B1 * | 7/2001 | Nagaoka ................. | A63F 13/10 273/153 J |
| 6,688,983 | B2 * | 2/2004 | Yoshizawa .............. | G07F 17/32 463/1 |
| 6,914,582 | B2 * | 7/2005 | Tanaka ................... | G06Q 30/06 345/1.1 |
| 7,120,583 | B2 * | 10/2006 | Kaneko ................... | G10L 21/06 345/473 |
| 7,944,479 | B2 * | 5/2011 | Ito ...................... | H04N 5/23212 348/211.5 |

(Continued)

FOREIGN PATENT DOCUMENTS

| JP | 3370530 | 11/2002 |
| JP | 2006-203548 | 8/2006 |

(Continued)

*Primary Examiner* — Gerald Gauthier
(74) *Attorney, Agent, or Firm* — Oblon, McClelland, Maier & Neustadt, L.L.P.

(57) ABSTRACT

A terminal device is connected to another terminal device through a network. The terminal device includes an imaging control unit, a receiving unit, a voice synthesis unit, a display control unit, and a voice output control unit. The imaging control unit controls an image captured with an imaging unit included in the other terminal device. The receiving unit receives the image captured with the imaging unit of the other terminal device, and a plurality of pieces of voice respectively input to a plurality of voice input units included in the other terminal device. The voice synthesis unit synthesizes the pieces of voice to generate synthesized voice. The display control unit displays the image on a display unit. The voice output control unit causes a voice output unit to output the synthesized voice.

7 Claims, 7 Drawing Sheets

(56) References Cited

U.S. PATENT DOCUMENTS

| | | | | |
|---|---|---|---|---|
| 7,966,123 B2* | 6/2011 | Watanabe | ............... | B60K 37/02 340/439 |
| 8,605,174 B2 | 12/2013 | Namie et al. | | |
| 2007/0157081 A1* | 7/2007 | Hara | ................. | G06F 17/30899 715/235 |
| 2008/0159584 A1* | 7/2008 | Kaneko | ............. | G06F 17/30265 382/100 |
| 2011/0134327 A1* | 6/2011 | Kaneko | ................ | H04N 5/4401 348/569 |
| 2012/0236164 A1* | 9/2012 | Nakano | .............. | H04N 5/23219 348/208.1 |
| 2014/0078244 A1* | 3/2014 | Kitazawa | ............... | H04N 7/147 348/14.08 |
| 2014/0333716 A1* | 11/2014 | Kitazawa | ................. | H04N 7/15 348/14.13 |
| 2015/0109487 A1* | 4/2015 | Yoon | ........................ | G06K 9/18 348/241 |
| 2015/0235650 A1* | 8/2015 | Kitazawa | ................. | H04N 7/15 348/14.04 |
| 2015/0264315 A1* | 9/2015 | Kitazawa | ................. | H04N 7/15 348/14.08 |

FOREIGN PATENT DOCUMENTS

| | | |
|---|---|---|
| JP | 2012-186551 | 9/2012 |
| JP | 2013-009304 | 1/2013 |

\* cited by examiner

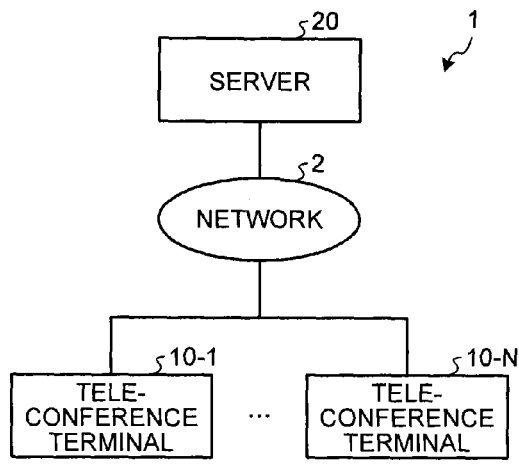
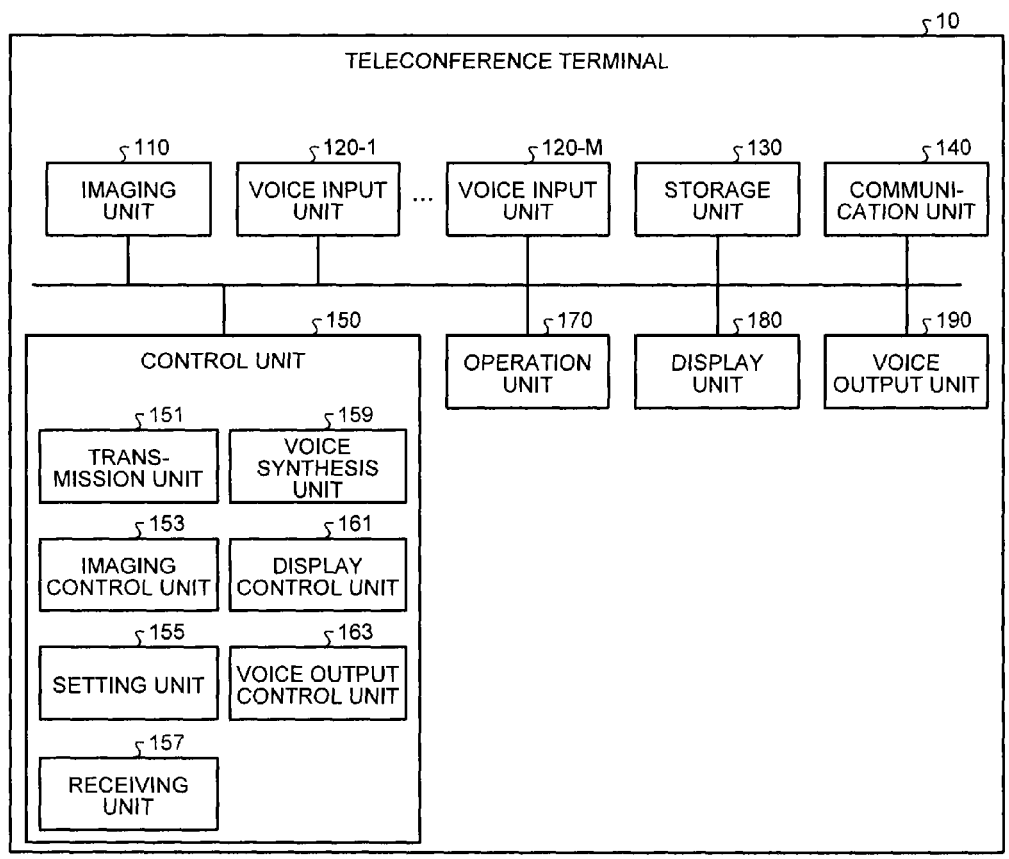

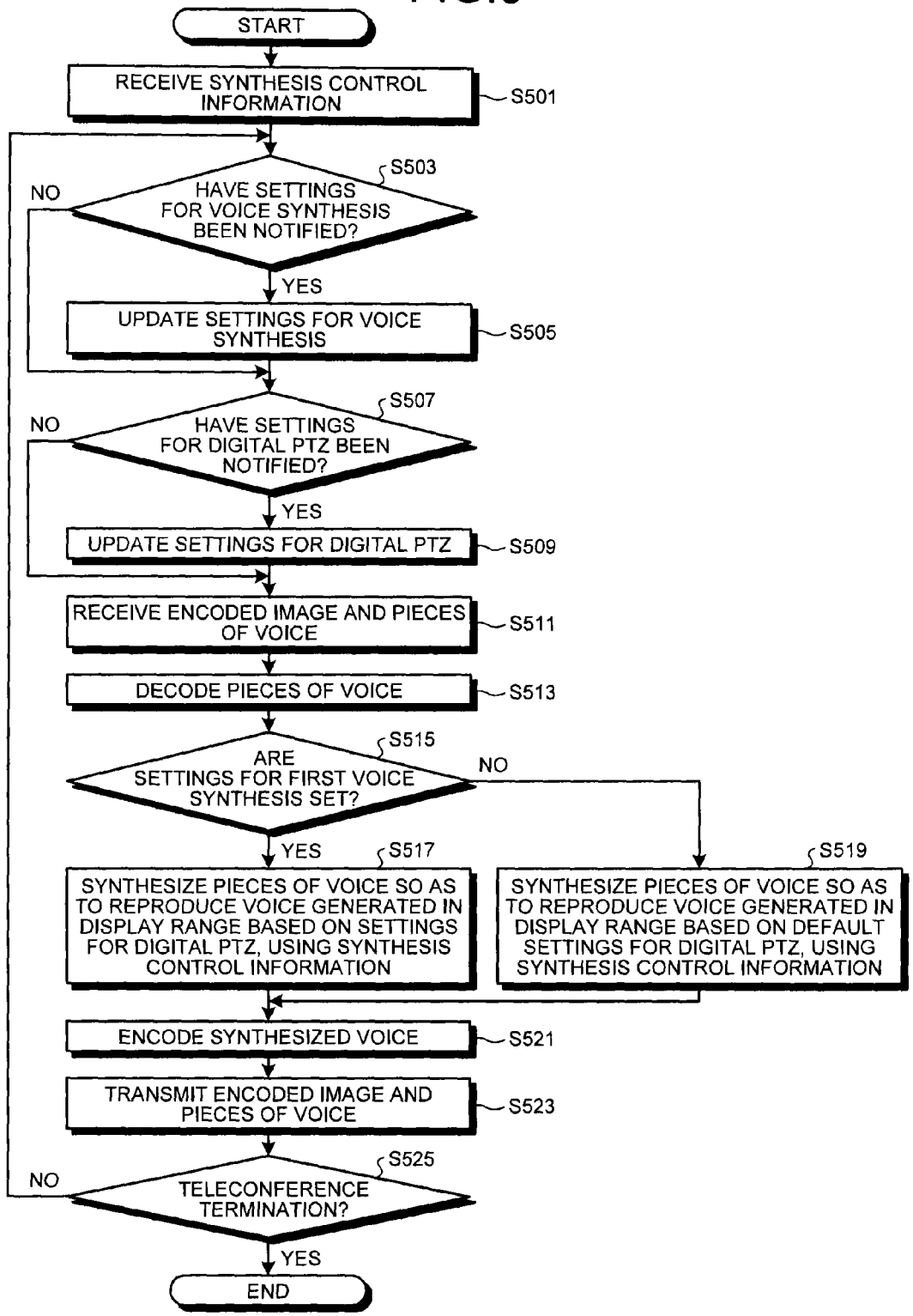

TERMINAL DEVICE AND COMMUNICATION SYSTEM

CROSS-REFERENCE TO RELATED APPLICATIONS

The present application claims priority to and incorporates by reference the entire contents of Japanese Patent Application No. 2014-029901 filed in Japan on Feb. 19, 2014 and Japanese Patent Application No. 2014-253498 filed in Japan on Dec. 15, 2014.

BACKGROUND OF THE INVENTION

1. Field of the Invention

The present invention relates to a terminal device and a communication system.

2. Description of the Related Art

Communication systems such as video teleconference systems (sometimes referred to as television conference systems) that implement a communication with a remote place by transmitting and receiving, for example, an image (video) or voice in real time through a network such as the Internet are known.

For example, in a video teleconference system, a teleconference terminal used by a participant at a first end takes an image of the participant and collects voice including a speech by the participant, and then transmits the image and voice to a teleconference terminal used by a participant at a second end. Meanwhile, the teleconference terminal used by a participant at the second end receives the image and voice to display the image and output the voice. This implements a remote conference.

For example, Japanese Patent No. 3,370,530 discloses a technique in which a video camera with a plurality of built-in microphones is used in a television teleconference system. The video camera includes a pan, tilt, and zoom (PTZ) function that can externally be controlled. The video camera synthesizes the voice signals input from the microphones with the parameter in accordance with the control signal indicating the state of PTZ, and outputs the synthesized signal to the outside.

The technique disclosed in Japanese Patent No. 3,370,530 can outputs the voice signal corresponding to the imaging range in which the video camera takes images (the taken images) to the outside. This can improve the sound quality of the television conference.

However, the conventional technique described above fails to flexibly synthesize the voice that is desired at the receiving end, for example, to synthesize the voice in a range that is to be noticed at the receiving end because the voice is synthesized at the sending end.

Therefore, there is a need for a terminal device and communication system that are capable of flexibly synthesizing the voice that is desired at the receiving end.

SUMMARY OF THE INVENTION

According to an embodiment, a terminal device is connected to another terminal device through a network. The terminal device includes an imaging control unit, a receiving unit, a voice synthesis unit, a display control unit, and a voice output control unit. The imaging control unit controls an image captured with an imaging unit included in the other terminal device. The receiving unit receives the image captured with the imaging unit of the other terminal device, and a plurality of pieces of voice respectively input to a plurality of voice input units included in the other terminal device. The voice synthesis unit synthesizes the pieces of voice to generate synthesized voice. The display control unit displays the image on a display unit. The voice output control unit causes a voice output unit to output the synthesized voice.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an exemplary configuration of a video teleconference system according to a first embodiment;

FIG. 2 is a block diagram of an exemplary configuration of a teleconference terminal according to the first embodiment;

FIG. 8 is a flowchart of an example of processing performed in a server according to an modification example.

DETAILED DESCRIPTION OF THE PREFERRED EMBODIMENTS

Figure 3:
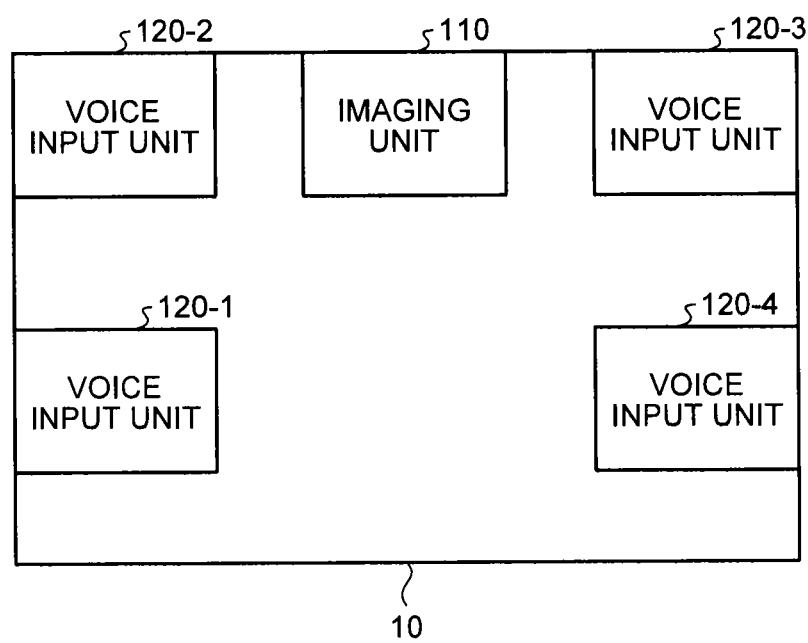
FIG. 3 is a diagram of an exemplary arrangement in a voice input unit according to the first embodiment.

The embodiments of the terminal device and communication system according to the present invention will be described in detail hereinafter with reference to the appended drawings. The present invention used in a video teleconference system will be described as an example hereinafter in the embodiments. However, the present invention is not limited to the embodiments.

First Embodiment

FIG. 1 is a block diagram of an exemplary configuration of a video teleconference system 1 according to the first embodiment. As illustrated in FIG. 1, the video teleconference system 1 (an example of a communication system) includes teleconference terminals 10-1 to 10-N (an example of a terminal device), and a server 20. Herein, the N is a natural number of two or more.

The teleconference terminals 10-1 to 10-N are connected to the server 20 through the network 2. The network 2 can be implemented, for example, with a Local Area Network (LAN) and the Internet.

The server 20 relays the transmission and reception of an image (video) or voice among the teleconference terminals 10-1 to 10-N. In addition to the function for relaying an image and voice, the server 20 further includes a teleconference control function for controlling, for example, the start and termination of the teleconference among the teleconference terminals 10-1 to 10-N. However, the description of the teleconference control function will be omitted.

The teleconference terminals 10-1 to 10-N are placed at different places, respectively, and transmit and receive an image or voice with each other through the server 20. It is assumed in the first embodiment that the teleconference terminals 10-1 to 10-N are each a dedicated terminal for a video teleconference. However, the teleconference terminals are not limited to the embodiment. The teleconference terminals may be each a laptop personal computer (PC), a smartphone, or a tablet terminal. Note that the teleconference terminals 10-1 to 10-N are sometimes referred to merely as a teleconference terminal 10 in the description below when it is not necessary to distinguish the teleconference terminals 10-1 to 10-N from each other.

FIG. 2 is a block diagram of an exemplary configuration of the teleconference terminal 10 according to the first embodiment. As illustrated in FIG. 2, the teleconference terminal 10 includes an imaging unit 110, voice input units 120-1 to 120-M, a storage unit 130, a communication unit 140, a control unit 150, an operation unit 170, a display unit 180, and a voice output unit 190. Herein, the M is a natural number of two or more.

The control unit 150 is configured to control each unit in the teleconference terminal 10. The control unit 150 may be implemented by the execution of a program with a processing device such as a Central Processing Unit (CPU), namely, by software. Alternatively, the control unit 150 may be implemented by hardware such as an Integrated Circuit (IC). Alternatively, the control unit 150 may be implemented by the combination of software and hardware. The control unit 150 includes a transmission unit 151, an imaging control unit 153, a setting unit 155, a receiving unit 157, a voice synthesis unit 159, a display control unit 161, and a voice output control unit 163.

First, a transmitting operation in which a teleconference terminal 10 transmits an image and voice to other teleconference terminal(s) 10 used (participating) in the teleconference will be described.

The imaging unit 110 is configured to take an image of a participant using the teleconference terminal 10 in the teleconference. The imaging unit 110 may be implemented with an imaging apparatus including an imaging device such as a Complementary Metal Oxide Semiconductor (CMOS) or a Charge Coupled Device (CCD), and a lens. Note that the lens may be a wide-angle lens.

The imaging unit 110 further includes a mechanical pan, tilt, and zoom (PTZ) function that may externally be controlled. The imaging range of the imaging unit 110 itself may externally be controlled. The mechanical PTZ function is for physically moving the imaging unit 110 so as to perform PTZ.

Each of the voice input units 120-1 to 120-M is configured to receive, for example, the voice of the speech by the participant using the teleconference terminal 10 in the teleconference. The voice input units 120-1 to 120-M may each be implemented with a voice input device such as a microphone. Note that the voice input units 120-1 to 120-M are sometimes referred to merely as a voice input unit 120 in the description below when it is not necessary to distinguish the voice input units 120-1 to 120-M from each other.

In the first embodiment, the voice input units 120-1 to 120-M are placed in the housing of the teleconference terminal 10 such that at least one of the voice input units 120-1 to 120-M may input the voice generated within the range in which the imaging unit 110 can take images.

Specifically, the voice input unit 120 has directionality and collects voice in a certain range in a predetermined direction to the voice input unit 120. The voice input unit 120 inputs the voice generated within the range in which voice is collected.

Thus, the voice input units 120-1 to 120-M are placed in the housing of the teleconference terminal 10 such that the range in which all of the voice input units 120-1 to 120-M collect voice covers the range in which the imaging unit 110 can take images.

FIG. 3 is a diagram of an exemplary arrangement of the voice input units 120-1 to 120-M in the first embodiment. In FIG. 3, M=4 holds. In the example of FIG. 3, the voice input units 120-1 to 120-4 are dispersedly arranged around the imaging unit 110 in the housing of the teleconference terminal 10 such that the range in which all of the voice input units 120-1 to 120-4 collect voice covers the range in which the imaging unit 110 can take images.

The storage unit 130 stores, for example, various programs executed in the teleconference terminal 10, and the data used for various types of processing performed in the teleconference terminal 10. The storage unit 130 stores, for example, the synthesis control information defining the position and the characteristics of directionality of each of the voice input units 120-1 to 120-M.

The storage unit 130 may be implemented with at least one of storage devices that can store the programs and the data magnetically, optically, and electrically, for example, a Hard Disk Drive (HDD), a Solid State Drive (SSD), a memory card, an optical disk, and a Random Access Memory (RAM).

The communication unit 140 is configured to communicate with an external appliance such as the server 20 through the network 2. The communication unit 140 may be implemented with a communication device such as a Network Interface Card (NIC) or a wireless communication device regardless of wired or wireless.

The transmission unit 151 transmits the image taken with the imaging unit 110, and the voice input to each of the voice input units 120-1 to 120-M. Specifically, the transmission unit 151 encodes the image taken with the imaging unit 110, and the voice input to each of the voice input units 120-1 to 120-M. The transmission unit 151 adds the destination information (for example, the IP addresses of the teleconference terminals 10 used in the teleconference) to the encoded image and voice to transmit them to the server 20 through the communication unit 140. This causes the server 20 to transfer the encoded image and pieces of voice to the other teleconference terminals 10 used in the teleconference.

For example, when the teleconference terminals 10-1 to 10-3 are used in a teleconference, the transmission unit 151 of the teleconference terminal 10-1 encodes the image taken with the imaging unit 110 of the teleconference terminal 10-1 and the voice input to each of the voice input units 120-1 to 120-M of the teleconference terminal 10-1 and then transmits the encoded image and voice through the server 20 to the teleconference terminals 10-2 and 10-3.

Similarly, the transmission unit 151 of the teleconference terminal 10-2 encodes the image taken with the imaging unit 110 of the teleconference terminal 10-2 and the voice input to each of the voice input units 120-1 to 120-M of the teleconference terminal 10-2 and then transmits the encoded image and voice through the server 20 to the teleconference terminals 10-1 and 10-3.

Similarly, the transmission unit 151 of the teleconference terminal 10-3 encodes the image taken with the imaging unit 110 of the teleconference terminal 10-3 and the voice input to each of the voice input units 120-1 to 120-M of the teleconference terminal 10-3 and then transmits the encoded image and voice through the server 20 to the teleconference terminals 10-1 and 10-2.

Note that the image encoded with the transmission unit 151 is processed with an A/D conversion and image processing that the control unit 150 performs. The pieces of voice encoded with the transmission unit 151 are processed with an A/D conversion that the control unit 150 performs. In that case, the pieces of voice encoded with the transmission unit 151 may further be processed with a voice processing that the control unit 150 performs.

The transmission unit 151 obtains the synthesis control information from the storage unit 130 and transmits the synthesis control information through the server 20 to the other teleconference terminals 10 used in the teleconference at the beginning of the teleconference.

Next, the receiving operation in which a teleconference terminal 10 receives an image and voice from other teleconference terminal(s) 10 used (participating) in the teleconference will be described.

The operation unit 170 is used by the participant using the teleconference terminal 10 in the teleconference in order to input various operations. The operation unit 170 may be implemented with an input device such as a mouse, a keyboard, a touch pad, or a touch panel.

The display unit 180 displays various screens such as images of a teleconference (images, for example, of the participants or whiteboard in the teleconference). The display unit 180 may be implemented with a display device such as a liquid display and a touch panel display. Note that the display unit 180 may be provided separately from the teleconference terminal 10.

The voice output unit 190 is configured to output the voice of the speech by the participant using the other teleconference terminal(s) 10 used in the teleconference. The voice output unit 190 may be implemented with a voice output device such as a loudspeaker.

The imaging control unit 153 remotely controls the imaging range of the imaging unit 110 included in the other teleconference terminal 10. Specifically, the participant using the teleconference terminal 10 in the teleconference inputs an operation for mechanically controlling the pan, tilt, and zoom (PTZ) of the imaging unit 110 from the operation unit 170 while watching the image that has been taken with the imaging unit 110 included in the other teleconference terminal 10 used in the teleconference and that is displayed on the display unit 180. Thus, the imaging control unit 153 generates a command for the mechanical and remote control of the pan, tilt, and zoom (PTZ) of the imaging unit 110 in accordance with the input of the operation, and then transmits the command from the communication unit 140 through the server 20 to the other teleconference terminal 10.

Consequently, the imaging unit 110 included in the other teleconference terminal 10 mechanically controls PTZ of itself (the other teleconference terminal 10) based on the transmitted command.

The setting unit 155 sets whether to perform a first voice synthesis or a second voice synthesis. The first voice synthesis is performed based on the settings for the remote control that is performed, by the imaging control unit 153, on the imaging range of the imaging unit 110 included in the other teleconference terminal 10. The second voice synthesis is performed based on the default settings for the imaging range. Specifically, the participant using the teleconference terminal 10 in the teleconference inputs, through the operation unit 170, the settings for a voice synthesis method. Thus, the setting unit 155 sets, in response to the input for the settings, the first voice synthesis or the second voice synthesis. It is assumed in the first embodiment that the imaging control unit 153 can remotely control the imaging range of the imaging unit 110 included in the other teleconference terminal 10 in the settings for performing the first voice synthesis while the imaging control unit 153 cannot remotely control the imaging range of the imaging unit 110 included in the other teleconference terminal 10 in the setting for performing the second voice synthesis.

The receiving unit 157 receives the image taken with the imaging unit 110 included in the other teleconference terminal 10 and the voice input to each of the voice input units 120-1 to 120-M included in the other teleconference terminal 10. Specifically, the receiving unit 157 receives the encoded image and pieces of voice that the server 20 has transferred from the other teleconference terminal 10 and then decodes the received image and pieces of voice.

For example, when the teleconference terminals 10-1 to 10-3 are used in a teleconference, the receiving unit 157 of the teleconference terminal 10-1 receives the encoded image and pieces of voice from the teleconference terminal 10-2 and then decodes the received image and pieces of voice while the receiving unit 157 of the teleconference terminal 10-1 receives the encoded image and pieces of voice from the teleconference terminal 10-3 and then decodes the received image and pieces of voice.

Similarly, the receiving unit 157 of the teleconference terminal 10-2 receives the encoded image and pieces of voice from the teleconference terminal 10-1 and then decodes the received image and pieces of voice while the receiving unit 157 of the teleconference terminal 10-2 receives the encoded image and pieces of voice from the teleconference terminal 10-3 and then decodes the received image and pieces of voice.

Similarly, the receiving unit 157 of the teleconference terminal 10-3 receives the encoded image and pieces of voice from the teleconference terminal 10-1 and then decodes the received image and pieces of voice while the receiving unit 157 of the teleconference terminal 10-3 receives the encoded image and pieces of voice from the teleconference terminal 10-2 and then decodes the received image and pieces of voice.

The receiving unit 157 further receives the synthesis control information from each of the other teleconference terminals 10 used in the teleconference at the beginning of the teleconference through the server 20.

The voice synthesis unit 159 generates a synthesized voice by synthesizing the pieces of voice that is received and decoded with the receiving unit 157.

For example, based on the settings for the remote control that is performed, by the imaging control unit 153, on the imaging range of the imaging unit 110 included in the other teleconference terminal 10, the voice synthesis unit 159 synthesizes the pieces of voice that the receiving unit 157 has received from the other teleconference terminal 10.

In the first embodiment, when the setting unit 155 sets the first voice synthesis, the voice synthesis unit 159 synthesizes the pieces of voice that the receiving unit 157 has received from the other teleconference terminal 10 based on the settings for the remote control that is performed, by the imaging control unit 153, on the imaging range of the imaging unit 110 included in the other teleconference terminal 10.

For example, the voice synthesis unit 159 specifies the imaging range of the imaging unit 110 included in the other teleconference terminal 10 in accordance with the settings for the remote control (for example, the setting value of PTZ) that has been performed, by the imaging control unit 153, on the imaging range of that imaging unit 110. Subsequently, the voice synthesis unit 159 synthesizes the pieces of voice that the receiving unit 157 has received from the other teleconference terminal 10 so as to reproduce the voice generated within the specified imaging range, using the synthesis control information that the receiving unit 157 has received from the other teleconference terminal 10.

On the other hand, when the setting unit 155 sets the second voice synthesis, the voice synthesis unit 159 synthesizes the pieces of voice that the receiving unit 157 has received from the other teleconference terminal 10 based on the default settings for the imaging range of the imaging unit 110 included in the other teleconference terminal 10. The default settings for the imaging range of the imaging unit 110 included in the other teleconference terminal 10 is known by, for example, the imaging control unit 153.

For example, the voice synthesis unit 159 specifies the default of the imaging range of the imaging unit 110 included in the other teleconference terminal 10 in accordance with the default settings (for example, the default setting value of PTZ) for the imaging range of that imaging unit 110. Subsequently, the voice synthesis unit 159 synthesizes the pieces of voice that the receiving unit 157 has received from the other teleconference terminal 10 so as to reproduce the voice generated within the specified imaging range, using the synthesis control information that the receiving unit 157 has received from the other teleconference terminal 10.

Note that the method disclosed in Japanese Patent No. 3,370,530 may be used as a method for synthesizing pieces of voice in the voice synthesis unit 159 and the more detailed description of the method will be omitted.

The display control unit 161 displays the image received and decoded with the receiving unit 157 on the display unit 180.

The voice output control unit 163 causes the voice output unit 190 to output the synthesized voice generated with the voice synthesis unit 159.

In the first embodiment each of the teleconference terminals 10 used in the teleconference repeats the transmitting operation and receiving operation of the image and pieces of voice, thereby enabling the remote conference among many places with the video teleconference system 1.

Figure 4:
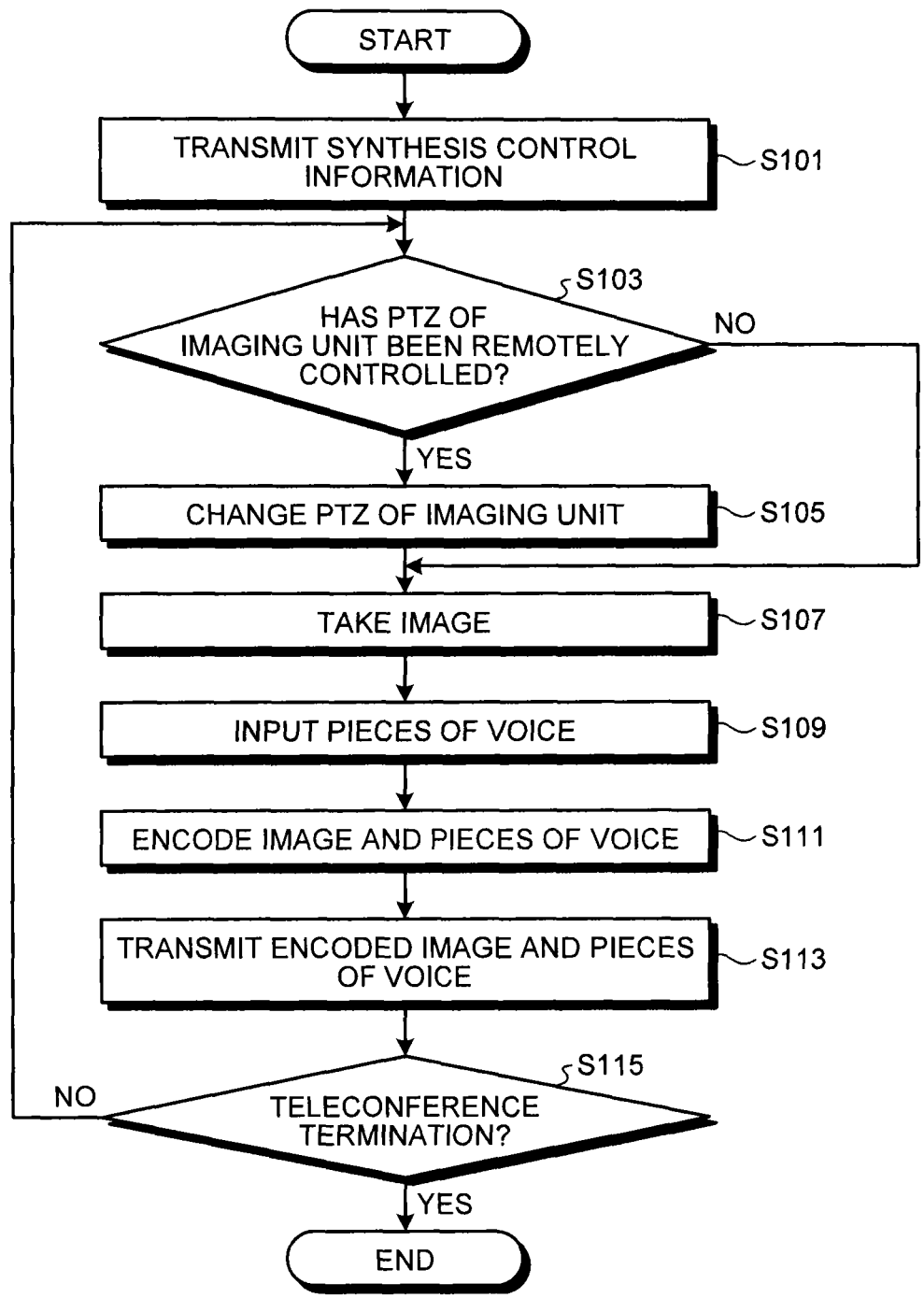
FIG. 4 is a flowchart of an example of transmitting operation performed in the teleconference terminal according to the first embodiment.

FIG. 4 is a flowchart of an example of transmitting operation performed with each of the teleconference terminals 10 according to the first embodiment.

First, the transmission unit 151 of the teleconference terminal 10 obtains the synthesis control information from the storage unit 130 to transmit the synthesis control information through the server 20 to the other teleconference terminals 10 used in the teleconference at the beginning of the teleconference (step S101).

When PTZ of the imaging unit 153 of the teleconference terminal 10 has been remotely controlled by the imaging control unit 153 of the other teleconference terminal 10 (Yes in step S103), the imaging unit 110 of the teleconference terminal 10 subsequently changes the settings for PTZ of itself to the remotely controlled settings (step S105).

When PTZ of the imaging unit 153 of the teleconference terminal 10 has not been remotely controlled by the imaging control unit 153 of the other teleconference terminal 10 (No in step S103), the process in step S105 is not performed.

Subsequently, the imaging unit 110 of the teleconference terminal 10 takes an image of a participant using the teleconference terminal 10 in the teleconference (step S107).

Subsequently, each of the voice input units 120-1 to 120-M of the teleconference terminal 10 receives the voice, for example, of the speech by the participant using the teleconference terminal 10 in the teleconference (step S109).

Subsequently, the transmission unit 151 of the teleconference terminal 10 encodes the image taken with the imaging unit 110 and the voice input to each of the voice input units 120-1 to 120-M (step S111) to transmit the encoded image and pieces of voice through the server 20 to the other teleconference terminals 10 used in the teleconference (step S113).

Subsequently, when the teleconference is not terminated (No in step S115), the process goes back to step S103. When the teleconference is terminated (Yes in step S115), the process is terminated.

Figure 5:
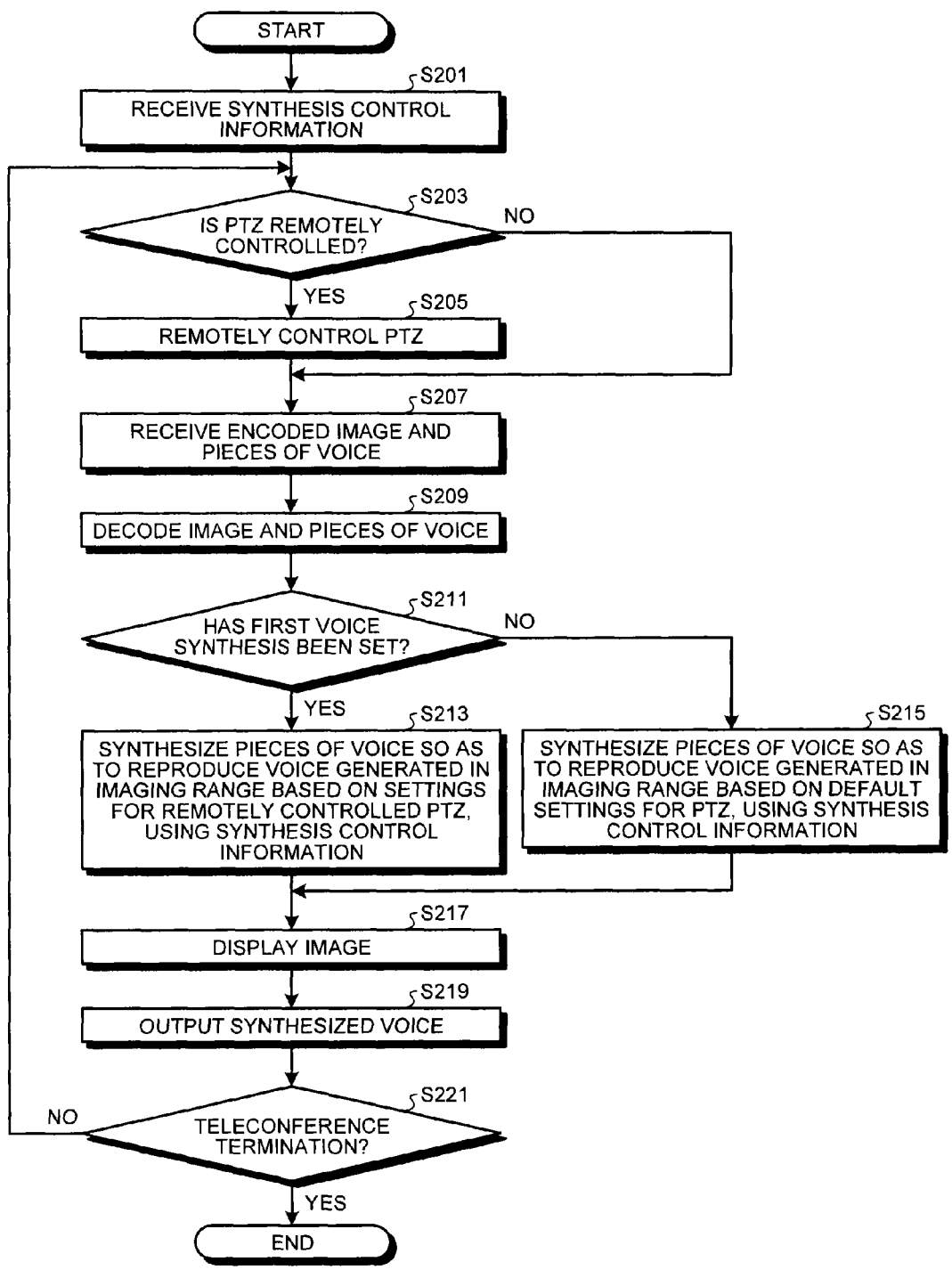
FIG. 5 is a flowchart of an example of receiving operation performed in the teleconference terminal according to the first embodiment.

FIG. 5 is a flowchart of an example of receiving operation performed in each of the teleconference terminals 10 in the first embodiment.

First, the receiving unit 157 of the teleconference terminal 10 receives the synthesis control information from the other teleconference terminals 10 used in the teleconference through the server 20 at the beginning of the teleconference (step S201).

Subsequently, when remote control of the PTZ of the imaging unit 110 included in the other teleconference terminal 10 is required (Yes in step S203), the imaging control unit 153 of the teleconference terminal 10 remotely controls the PTZ of the imaging unit 110 included in the other teleconference terminal 10 (step S205). At that time, the imaging control unit 153 may obtain the setting value of the remotely controlled PTZ of the imaging unit 110 from the other teleconference terminal 10.

When the PTZ of the imaging unit 110 included in the other teleconference terminal 10 is not remotely controlled (No in step S203), the process in step S205 is not performed.

Subsequently, the receiving unit 157 of the teleconference terminal 10 receives the image taken with the imaging unit 110 included in the other teleconference terminal 10 and the voice input to each of the voice input units 120-1 to 120-M included in the other teleconference terminal 10 (step S207) and then decodes the received image and pieces of voice (step S209).

Subsequently, when the setting unit 155 sets the first voice synthesis (Yes in step S211), the voice synthesis unit 159 of the teleconference terminal 10 synthesizes the received pieces of voice that the receiving unit 157 has received from the other teleconference terminal 10, using the synthesis control information that the receiving unit 157 has received from the other teleconference terminal 10, in such a manner to reproduce the voice generated within the imaging range determined based on the settings for the PTZ of the imaging unit 110 of the other teleconference terminal 10 that has been remotely controlled with the imaging control unit 153 (step S213).

On the other hand, when the setting unit 155 does not set the first voice synthesis (No in step S211), the voice synthesis unit 159 synthesizes the pieces of voice that the receiving unit 157 has received from the other teleconference terminal 10, using the synthesis control information that the receiving unit 157 has received from the other teleconference terminal 10, in such a manner to reproduce the voice generated within the imaging range determined based on the default setting for the PTZ of the imaging unit 110 of the other teleconference terminal 10 (step S215).

Subsequently, the display control unit 161 of the teleconference terminal 10 displays the image received and decoded with the receiving unit 157 on the display unit 180 (step S217).

Subsequently, the voice output control unit 163 of the teleconference terminal 10 causes the voice output unit 190 to output the synthesized voice generated with the voice synthesis unit 159 (step S219).

Subsequently, when the teleconference is not terminated (No in step S221), the process goes back to step S203. When the teleconference is terminated (Yes in step S221), the process is terminated.

As described above, according to the first embodiment, the pieces of voice is synthesized at the receiving end. This enables the flexible voice synthesis that is desired at the receiving end, for example, the synthesis of the pieces of voices generated within the range that is to be noticed at the receiving end.

For example, the pieces of voice received from the other teleconference terminal 10 are synthesized so as to reproduce the voice generated within the imaging range of the imaging unit 110 of the other teleconference terminal 10 that has been remotely controlled with the imaging control unit 153. This can generate the synthesized voice corresponding to the imaging range (the taken image), thereby enabling a remote conference with realism as if the teleconference is held in a place.

For example, the pieces of voice received from the other teleconference terminal 10 are synthesized so as to reproduce the voice generated within the default of the imaging range of the imaging unit 110 included in the other teleconference terminal 10. If the imaging unit 110 included in the other teleconference terminal 10 takes images within the range in which voice is not generated, for example, if the imaging unit 110 does not take an image of a participant but takes an image of the whiteboard in the teleconference, the voice of the speech by the participant using the other teleconference terminal 10 in the teleconference can uninterruptedly be reproduced with a certain level of quality.

Especially, according to the first embodiment, the pieces of voice are performed at the receiving end. Therefore, even if the teleconference is held among many places and the voice generated within the different ranges are to be noticed at a plurality of receiving ends, respectively, the voice synthesis that is desired at each receiving end can be performed. This enables the flexible voice synthesis that is desired at each of the receiving ends.

Second Embodiment

An example in which an imaging unit 110 does not include a mechanical PTZ function that can externally be controlled will be described in the second embodiment. Specifically, an imaging control unit 153, a setting unit 155, a voice synthesis unit 159, and a display control unit 161 will mainly be described in the second embodiment as the different points from the first embodiment. The description of the contents similar to the first embodiment will be omitted.

In the second embodiment, the imaging control unit 153 does not remotely control the imaging range of the imaging unit 110 included in other teleconference terminal 10, but controls the display range of the image that is taken with the other teleconference terminal 10.

For example, the participant using a teleconference terminal 10 in the teleconference inputs an operation for controlling the digital PTZ through the operation unit 170 while watching the image that has been taken with the imaging unit 110 included in the other teleconference terminal 10 used in the teleconference and that is displayed on the display unit 180. Subsequently, the imaging control unit 153 generates a command (for example, a command indicating the setting value of the digital PTZ) for controlling the digital PTZ based on the input of the operation and then outputs the command to the display control unit 161. The digital PTZ is to virtually perform pan, tilt, and zoom (PTZ) with respect to an image in order to control the display range of the image.

For example, when the participant using the teleconference terminal 10 in the teleconference inputs, through the operation unit 170, an operation for enlarging the region to which the participant has paid attention in the image displayed on the display unit 180. Then, the imaging control unit 153 generates a command for causing the display control unit 161 to perform the digital PTZ so as to enlarge the display range of the image, and then outputs the command to the display control unit 161.

This enables the display control unit 161 to perform the digital PTZ of the image that the receiving unit 157 has received from the other teleconference terminal 10 based on the output command.

In the second embodiment, the setting unit 155 sets whether to perform a first voice synthesis and a first display control or perform a second voice synthesis and a second display control. The first voice synthesis and first display control are performed based on the settings for the digital PTZ (the display range of the image) controlled with the imaging control unit 153. The second voice synthesis and second display control are performed based on the default settings for the digital PTZ controlled with the imaging control unit 153. Specifically, the participant using the teleconference terminal 10 in the teleconference inputs an operation for the settings for a voice synthesizing method and a display control method through the operation unit 170. Thus, the setting unit 155 sets whether to perform the first voice synthesis and first display control or perform the second voice synthesis and second display control in accordance with the input of the operation for the settings. It is assumed in the second embodiment that the imaging control unit 153 can control the digital PTZ (the display range of the image) in the settings for performing the first voice synthesis and first display control, and the imaging control unit 153 cannot control the digital PTZ (the display range of the image) in the settings for performing the second voice synthesis and second display control.

In the second embodiment, the voice synthesis unit 159 synthesizes a plurality of pieces of voice that the receiving unit 157 has received from the other teleconference terminal 10, for example, based on the settings for the digital PTZ (the display range of the image) controlled with the imaging control unit 153.

Specifically, when the setting unit 155 sets the first voice synthesis and first display control, the voice synthesis unit 159 synthesizes a plurality of pieces of voice that the receiving unit 157 has received from the other teleconference terminal 10 based on the settings for the digital PTZ of the image that the receiving unit 157 has received from the other teleconference terminal 10. The digital PTZ is controlled with the imaging control unit 153.

For example, the voice synthesis unit 159 specifies the display range of the image that the receiving unit 157 has received from the other teleconference terminal 10 in accordance with the digital PTZ (for example, the setting value of the digital PTZ) of the image. The digital PTZ is controlled with the imaging control unit 153. Then, the voice synthesis unit 159 synthesizes the pieces of voice that the receiving unit 157 has received from the other teleconference terminal 10, using the synthesis control information that the receiving unit 157 has received from the other teleconference terminal 10, so as to reproduce the voice generated within the specified display range.

On the other hand, when the setting unit 155 sets the second voice synthesis and second display control, the voice synthesis unit 159 synthesizes the pieces of voice that the receiving unit 157 has received from the other teleconference terminal 10 based on the default settings for the digital PTZ of the image that the receiving unit 157 has received from the other teleconference terminal 10. The digital PTZ is controlled with the imaging control unit 153. The default settings for the digital PTZ controlled with the imaging control unit 153 is known by, for example, the imaging control unit 153.

For example, the voice synthesis unit 159 specifies the default of the display range of an image in accordance with the default settings for the digital PTZ (for example, the settings for the display of the whole of the image) controlled with the imaging control unit 153. Then, the voice synthesis unit 159 synthesizes the pieces of voice that the receiving unit 157 has received from the other teleconference terminal 10, using the synthesis control information that the receiving unit 157 has received from the other teleconference terminal 10, so as to reproduce the voice generated within the specified display range.

In the second embodiment, the display control unit 161 displays the image that the receiving unit 157 has received from the other teleconference terminal 10 on the display unit 180, for example, based on the settings for the digital PTZ (the display range of the image) controlled with the imaging control unit 153.

Specifically, when the setting unit 155 sets the first voice synthesis and first display control, the display control unit 161 displays the image that the receiving unit 157 has received from the other teleconference terminal 10 on the display unit 180 based on the settings for the digital PTZ of the image that the receiving unit 157 has received from the other teleconference terminal 10. The digital PTZ is controlled with the imaging control unit 153.

For example, the display control unit 161 performs the digital PTZ of the image that the receiving unit 157 has received from the other teleconference terminal 10 based on the settings for the digital PTZ of the image (for example, a command indicating the setting value of the digital PTZ) that the receiving unit 157 has received from the other teleconference terminal 10, and then displays the image on the display unit 180. The digital PTZ is controlled with the imaging control unit 153. This can display the image of which display range is controlled as if a mechanical PTZ has been performed on the image.

On the other hand, when the setting unit 155 sets the second voice synthesis and second display control, the display control unit 161 displays the image that the receiving unit 157 has received from the other teleconference terminal 10 on the display unit 180 based on the default settings for the digital PTZ of the image that the receiving unit 157 has received from the other teleconference terminal 10. The digital PTZ is controlled with the imaging control unit 153. The default settings for the digital PTZ controlled with the imaging control unit 153 is known by, for example, the imaging control unit 153.

For example, the display control unit 161 performs the digital PTZ of the image that the receiving unit 157 has received from the other teleconference terminal 10 as necessary based on the default settings for the digital PTZ (for example, the settings for the display of the whole of the image) controlled with the imaging control unit 153, and then the display control unit 161 displays the image on the display unit 180. When the digital PTZ of the image that the receiving unit 157 has received from the other teleconference terminal 10 is not required for the default settings for the digital PTZ controlled with the imaging control unit 153, the display control unit 161 displays the image on the display unit 180 without change.

Figure 6:
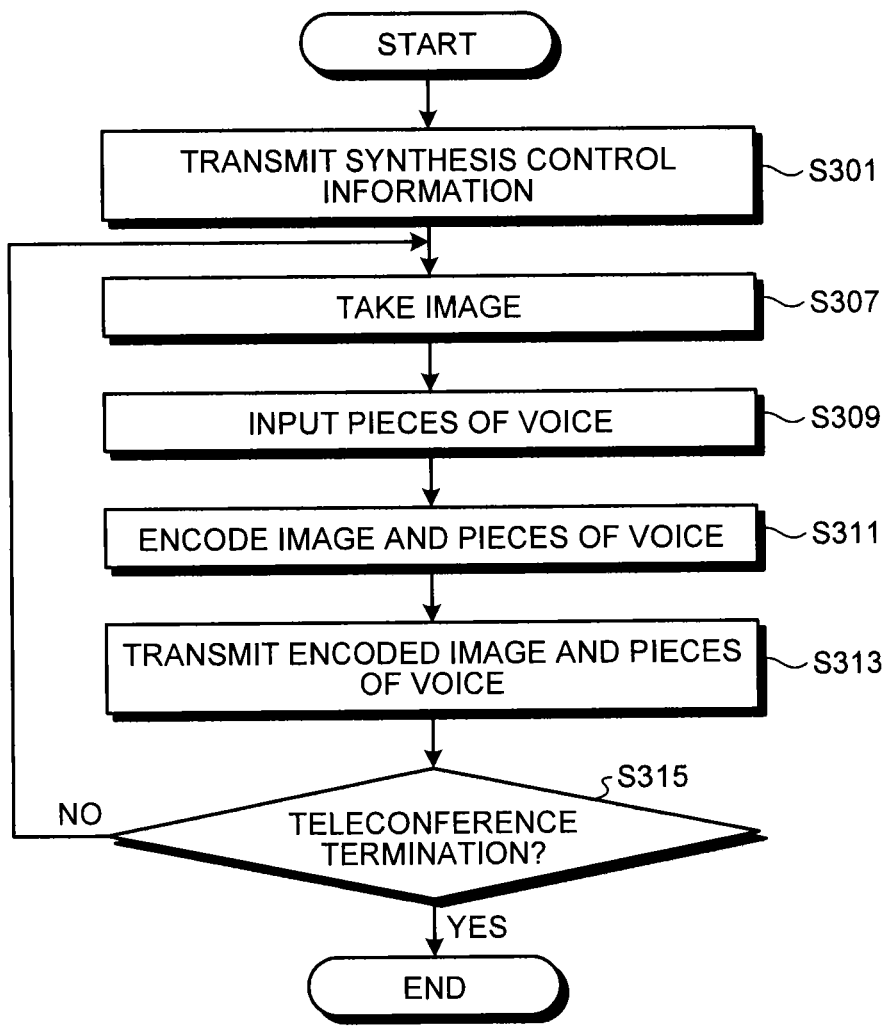
FIG. 6 is a flowchart of an example of transmitting operation performed in a teleconference terminal according to a second embodiment.

FIG. 6 is a flowchart of an example of transmitting operation performed in each of the teleconference terminals 10 in the second embodiment.

First, the transmission unit 151 of the teleconference terminal 10 obtains the synthesis control information from the storage unit 130 to transmit the synthesis control information through the server 20 to the other teleconference terminals 10 used in the teleconference at the beginning of the teleconference (step S301).

Subsequently, the imaging unit 110 of the teleconference terminal 10 takes an image of the participant using the teleconference terminal 10 in the teleconference (step S307).

Subsequently, each of the voice input units 120-1 to 120-M of the teleconference terminal 10 receives the voice, for example, of the speech by the participant using the teleconference terminal 10 in the teleconference (step S309).

Subsequently, the transmission unit 151 of the teleconference terminal 10 encodes the image taken with the imaging unit 110 and the voice input to each of the voice input units 120-1 to 120-M (step S311) to transmit the encoded image and pieces of voice through the server 20 to the other teleconference terminals 10 used in the teleconference (step S313).

Subsequently, when the teleconference is not terminated (No in step S315), the process goes back to step S307. When the teleconference is terminated (Yes in step S315), the process is terminated.

Figure 7:
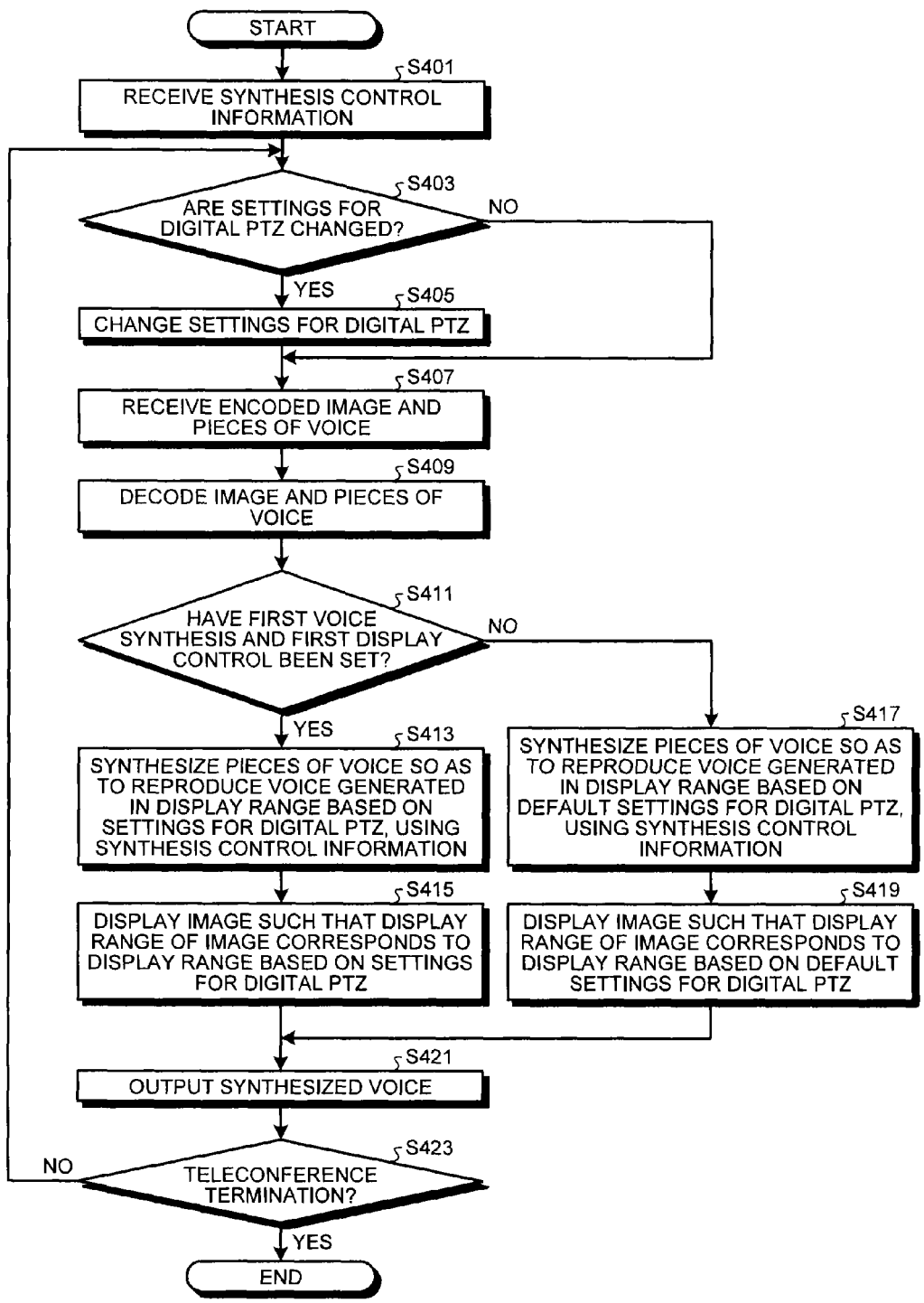
FIG. 7 is a flowchart of an example of receiving operation performed in the teleconference terminal according to the second embodiment.

FIG. 7 is a flowchart of an example of receiving operation performed in each of the teleconference terminals 10 in the second embodiment.

First, the receiving unit 157 of the teleconference terminal 10 receives the synthesis control information from the storage unit 130 through the server 20 from the other teleconference terminals 10 used in the teleconference at the beginning of the teleconference (step S401).

Sequentially, when the change of the settings for the digital PTZ is required (Yes in step S403), the imaging control unit 153 of the teleconference terminal 10 changes the settings for the digital PTZ (step S405).

When the change of the digital PTZ is not required (No in step S403), the process in step S405 is not performed.

Subsequently, the receiving unit 157 of the teleconference terminal 10 receives the image taken with the imaging unit 110 included in the other teleconference terminal 10 and the voice input to each of the voice input units 120-1 to 120-M included in the other teleconference terminal 10 (step S407) and then decodes the received image and pieces of voice (step S409).

Subsequently, when the setting unit 155 sets the first voice synthesis and first display control (Yes in step S411), the voice synthesis unit 159 of the teleconference terminal 10 synthesizes the pieces of voice that the receiving unit 157 has received from the other teleconference terminal 10 so as to reproduce the voice generated within the display range based on the settings for the digital PTZ of the image that the receiving unit 157 has received from the other teleconference terminal 10, using the synthesis control information that the receiving unit 157 has received from the other teleconference terminal 10 (step S413). The digital PTZ is controlled with the imaging control unit 153.

Subsequently, the display control unit 161 of the teleconference terminal 10 performs the digital PTZ of the image that the receiving unit 157 has received from the other teleconference terminal 10 such that the display image of the image corresponds to the display range based on the settings for the digital PTZ of the image controlled with the imaging control unit 153, and then displays the image on the display unit 180 (step S415).

On the other hand, when the setting unit 155 does not set the first voice synthesis and first display control (No in step S411), the voice synthesis unit 159 synthesizes the pieces of voice that the receiving unit 157 has received from the other teleconference terminal 10 so as to reproduce the voice generated within the display range determined based on the default settings for the digital PTZ of the image that the receiving unit 157 has received from the other teleconference terminal 10, the digital PTZ being controlled with the imaging control unit 153, using the synthesis control information that the receiving unit 157 has received from the other teleconference terminal 10 (step S417).

Subsequently, the display control unit 161 of the teleconference terminal 10 performs the digital PTZ of the image that the receiving unit 157 has received from the other teleconference terminal 10 such that the display image of the image corresponds to the display range based on the settings for the digital PTZ of the image controlled with the imaging control unit 153, and then displays the image on the display unit 180 (step S419).

Subsequently, the voice output control unit 163 of the teleconference terminal 10 causes the voice output unit 190 to output the synthesized voice generated with the voice synthesis unit 159 (step S421).

Subsequently, when the teleconference is not terminated (No in step S423), the process goes back to step S403. When the teleconference is terminated (Yes in step S423), the process is terminated.

As described above, according to the second embodiment, the pieces of voice is synthesized while performing the digital PTZ at the receiving end. This enables the flexible voice synthesis that is desired at the receiving end, for example, the synthesis of the pieces of voice generated within the range that is to be noticed at the receiving end.

For example, the pieces of voice received from the other teleconference terminal 10 are synthesized so as to reproduce the voice generated within a designated and predetermined range in the ranges in which the other teleconference terminal 10 has taken images. This can generate the synthesized voice corresponding to the designated and predetermined range, thereby enabling a remote conference with realism as if the teleconference is held in a place.

For example, the pieces of voice received from the other teleconference terminal 10 are synthesized so as to reproduce the voice generated within the default of the range of the image taken with the other teleconference terminal 10. If the imaging unit 110 included in the other teleconference terminal 10 takes images within the range in which voice is not generated, for example, if the imaging unit 110 does not take an image of a participant but takes an image of the whiteboard in the teleconference, the voice of the speech by the participant using the other teleconference terminal 10 in the teleconference can uninterruptedly be reproduced with a certain level of quality.

Especially, according to the second embodiment, the pieces of voice are performed at the receiving end. Therefore, even if the teleconference is held among many places and the voice generated within the different ranges are to be noticed at a plurality of receiving ends, respectively, the flexible voice synthesis that is desired at each receiving end can be performed.

Modification Example

The present invention is not limited to each of the embodiments described above, and can variously be changed. For example, at least one of the encoding, decoding, and voice synthesis performed with each of the teleconference terminals 10 may be performed with the server 20.

For example, to synthesize voice with the server 20, the server 20 includes at least the components similar to the communication unit 140, transmission unit 151, receiving unit 157, and voice synthesis unit 159 included in the teleconference device 10.

FIG. 8 is a flowchart of an example of processing performed in the server 20 according to the modification example.

First, a receiving unit 157 of the server 20 receives the synthesis control information from a teleconference terminal 10 used at a sending end in the teleconference at the beginning of the teleconference (step S501).

Subsequently, when receiving the settings for performing a first voice synthesis or a second voice synthesis from the teleconference terminal 10 used at the receiving end in the teleconference (Yes in step S503), the receiving unit 157 of the server 20 updates the settings for the voice synthesis in the teleconference terminal 10 at the receiving end with the received settings (step S505). When not receiving the settings for performing the first voice synthesis or the second voice synthesis from the teleconference terminal 10 used at the receiving end (No in step S503), the process in step S505 is not performed.

Subsequently, when receiving the settings for the digital PTZ from the teleconference terminal 10 used at the receiving end in the teleconference (Yes in step S507), the receiving unit 157 of the server 20 updates the settings for the digital PTZ in the teleconference terminal 10 used at the receiving end with the received settings (step S509). When not receiving the settings for the digital PTZ from the teleconference terminal 10 used at the receiving end in the teleconference (No in step S507), the process in step S509 is not performed.

Subsequently, the receiving unit 157 of the server 20 receives the image that has been taken with the imaging unit 110 included in the teleconference terminal 10 at the sending end and has subsequently been encoded, and the voice that has been input to each of the voice input units 120-1 to 120-M included in the teleconference terminal 10 at the sending end and has subsequently been encoded (step S511), and then decodes the received pieces of voice (step S513).

Subsequently, when the settings for the voice synthesis in the teleconference terminal 10 at the receiving end is configured as the first voice synthesis (Yes in step S515), the voice synthesis unit 159 of the server 20 synthesizes the decoded pieces of voice so as to reproduce the voice generated within the display range based on the settings for the digital PTZ that the receiving unit 157 of the server 20 has received from the teleconference terminal 10 used at the receiving end, using the synthesis control information that the receiving unit 157 of the server 20 has received from the teleconference terminal 10 at the sending end (step S517).

On the other hand, when the settings for the voice synthesis in the teleconference terminal 10 at the receiving end is configured as the second voice synthesis (No in step S515), the voice synthesis unit 159 of the server 20 synthesizes the decoded pieces of voice so as to reproduce the voice generated within the display range based on the default settings for the digital PTZ in the teleconference terminal 10 at the receiving end, using the synthesis control information that the receiving unit 157 of the server 20 has received from the teleconference terminal 10 at the sending end (step S519).

Subsequently, the transmission unit 151 of the server 20 encodes the synthesized voice (step S521), and then transmits the encoded image and synthesized voice to the teleconference terminal 10 at the receiving end (step S523).

Subsequently, when the teleconference is not terminated (No in step S525), the process goes back to step S503. When the teleconference is terminated (Yes in step S525), the process is terminated.

The modification example has the same effect as the second embodiment. Especially, the server 20 performs the voice synthesis processing in the modification example. This can reduce the load on each of the teleconference terminals 10 if the number of types of voice synthesis processing increases.

Hardware Configuration

The hardware configuration of each of the teleconference terminals 10 in the embodiments will be described. Each of the teleconference terminals 10 in the embodiments includes a control device such as a CPU, a storage device such as a Read Only Memory (ROM) or a RAM, an external storage device such as an HDD or an SSD, a display device such as a display, an input device such as a mouse or a keyboard, a communication device such as an NIC, an imaging apparatus such as a digital camera, a voice input device such as a microphone, and a voice output device such as a loudspeaker. Each of the teleconference terminals 10 may be implemented with the hardware configuration using a normal computer.

The programs to be executed with each of the teleconference terminals 10 in the embodiments are stored and provided in an installable or executable file format and in a computer readable storage medium such as a CD-ROM, a CD-R, a memory card, a Digital Versatile Disk (DVD), or a flexible disk (FD).

Alternatively, the programs to be executed with each of the teleconference terminals 10 in the embodiments may be stored in a computer connected to a network such as the Internet such that the programs may be provided by the download through the network. Alternatively, the programs to be executed with each of the teleconference terminals 10 in the embodiments may be provided or distributed through a network such as the Internet. Alternatively, the programs to be executed with each of the teleconference terminals 10 in the embodiments may be provided after being embedded, for example, in a ROM in advance.

The programs to be executed with each of the teleconference terminals 10 in the embodiments are each a module to implement each of the components described above on a computer. As actual hardware, the control device reads the program from the external storage device onto the storage device and executes the program. This can implement each of the components on the computer.

The present invention has an effect of flexibly synthesizing the voice that the voice that is desired at the receiving end.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device connected to another terminal device through a network, the terminal device comprising:
    processing circuitry configured to
        control an image captured with a camera included in the other terminal device, including remotely controlling an imaging range of the camera;
        receive the image captured with the camera of the other terminal device, and a plurality of pieces of voice respectively input to a plurality of microphones included in the other terminal device;
        synthesize the pieces of voice to generate synthesized voice;
        display the image on a display; and
        cause a speaker to output the synthesized voice,
    wherein the processing circuitry is further configured to
        set whether to perform a first voice synthesis based on settings for the remote control of the imaging range, or perform a second voice synthesis based on default settings for the imaging range, and
        synthesize the pieces of voice based on the settings for the remote control of the imaging range when the first voice synthesis is set, and synthesize the pieces of voice based on the default settings for the imaging range when the second voice synthesis is set.

2. The terminal device according to claim 1, wherein the processing circuitry is further configured to control a display range of the image.

3. The terminal device according to claim 1, wherein the processing circuitry is further configured to synthesize the pieces of voice based on settings for the remote control of the imaging range.

4. The terminal device according to claim 2, wherein the processing circuitry is further configured to synthesize the pieces of voice based on the settings for the display range, and display the image on the display based on the settings for the display range.

5. The terminal device according to claim 2, wherein the processing circuitry is further configured to:
    set whether to perform the first voice synthesis and a first display control based on the settings for the display range, or perform the second voice synthesis and a second display control based on default settings for the display range,
    synthesize the pieces of voice based on the settings for the display range when the first voice synthesis and the first display control are set, and synthesize the pieces of voice based on the default settings for the display range when the second voice synthesis and the second display control are set, and
    display the image on the display based on the settings for the display range when the first voice synthesis and the first display control are set, and display the image on the display based on the default settings for the display range when the second voice synthesis and the second display control are set.

6. A communication system, comprising:
    a plurality of terminal devices connected to each other through a network, wherein a first terminal device among the terminal devices includes
        a camera;
        a plurality of microphones; and
        a transmitter configured to transmit an image taken with the camera, and pieces of voice respectively input to the microphones, and
    a second terminal device among the terminal devices includes
        processing circuitry configured to
            remotely control an imaging range of the camera;
            receive the image and the pieces of voice;
            synthesize the pieces of voice to generate synthesized voice;
            display the image on a display; and
            cause a speaker to output the synthesized voice,
        wherein the processing circuitry is further configured to
            set whether to perform a first voice synthesis based on settings for the remote control of the imaging range, or perform a second voice synthesis based on default settings for the imaging range, and
            synthesize the pieces of voice based on the settings for the remote control of the imaging range when the first voice synthesis is set, and synthesize the pieces of voice based on the default settings for the imaging range when the second voice synthesis is set.

7. A communication system, comprising:
a plurality of terminal devices connected to each other through a network, wherein a first terminal device among the terminal devices includes
   a camera;
   a plurality of microphones; and
   a transmitter configured to transmit an image taken with the camera, and a pieces of voice respectively input to the microphones, and
a second terminal device among the terminal devices includes
   processing circuitry configured to
      receive the image and the pieces of voice;
      remotely control an imaging range of the camera;
      control a display range of the image;
      synthesize the pieces of voice to generate synthesized voice;
      display the image on a display; and
      cause a speaker to output the synthesized voice,
wherein the processing circuitry is further configured to
   set whether to perform a first voice synthesis based on settings for the remote control of the imaging range, or perform a second voice synthesis based on default settings for the imaging range, and
   synthesize the pieces of voice based on the settings for the remote control of the imaging range when the first voice synthesis is set, and synthesize the pieces of voice based on the default settings for the imaging range when the second voice synthesis is set.

* * * * *